United States Patent
Tanguay et al.

[15] 3,647,046
[45] Mar. 7, 1972

[54] CONVEYOR

[72] Inventors: Jean-Paul Tanguay; Elie Dallaire, both of De Roberval, Quebec, Canada

[73] Assignee: Placements Jean Paul Tanguay Limitee, St. Prime, Quebec, Canada

[22] Filed: June 10, 1970

[21] Appl. No.: 44,995

[52] U.S. Cl. .............................................. 198/127, 198/204
[51] Int. Cl. .............................................. B65g 13/02
[58] Field of Search .............. 198/34, 127, 204, 87, 94, 105, 198/115, 99; 144/22, 34, 312; 143/46

[56] References Cited

UNITED STATES PATENTS

| 3,500,882 | 3/1970 | Tanguay | 143/46 |
| 3,182,785 | 5/1965 | Tourtellotte | 198/127 |

*Primary Examiner*—Richard E. Aegerter
*Attorney*—Raymond A. Robic

[57] ABSTRACT

A conveyor, for tree stems, formed of a fixed section and of a section capable of pivoting upwardly about an axis transverse to the direction of travel of the tree stems. The fixed as well as the pivotable sections are provided with gripper rollers adapted to drive the tree stems in the conveyor.

5 Claims, 3 Drawing Figures

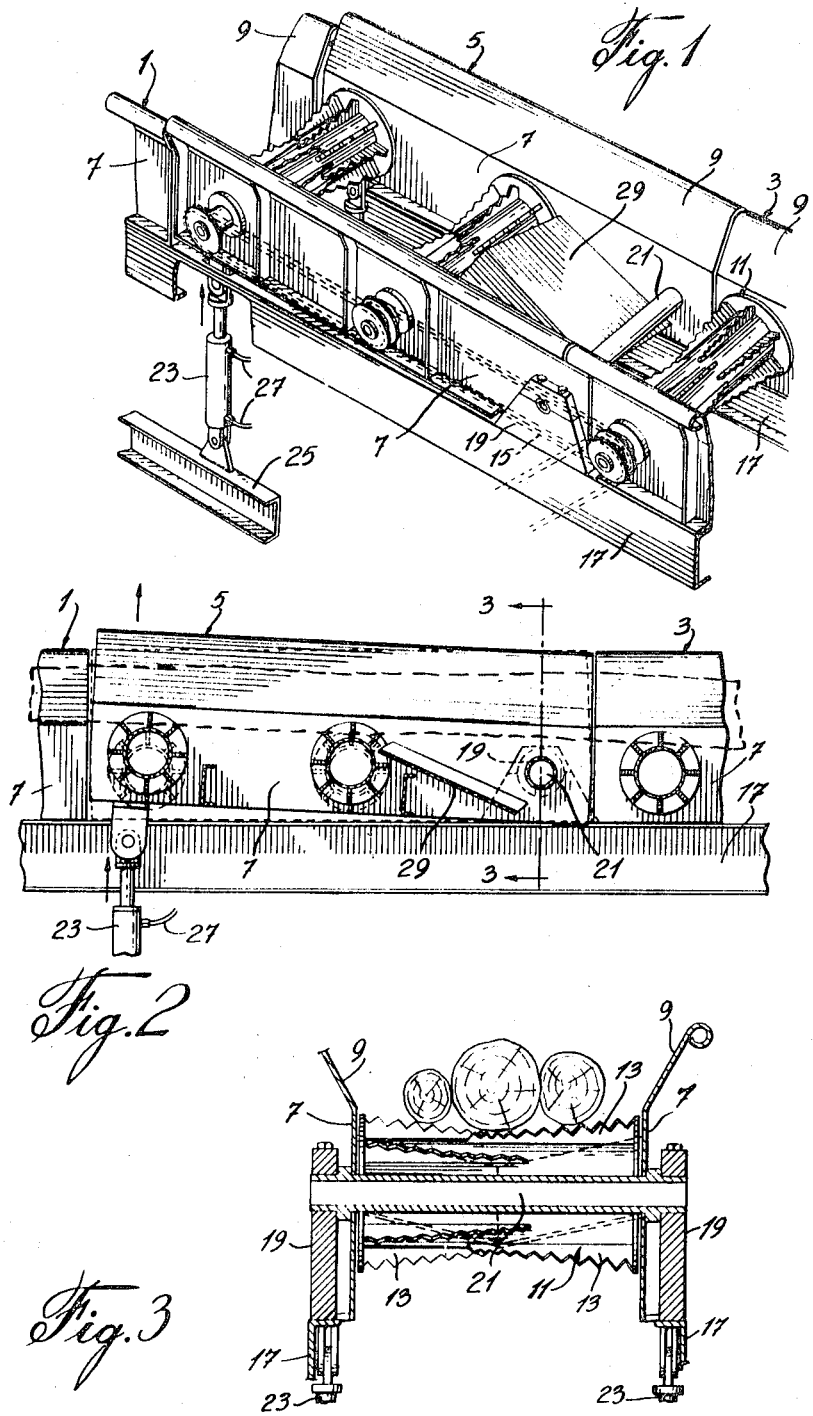

CONVEYOR

The present invention relates to a conveyor for transporting articles of substantial lengths such as tree stems.

The conveyor of the present invention is of the type that finds particular use in installations such as the movable slasher described and claimed in my previous Canadian Pat. No. 796,109 of Oct. 8, 1968 and its corresponding U.S. Pat. No. 3,500,882 of Mar. 17, 1970.

In installations of this type, several tree stems are loaded at one time on the conveyor to be transported to a station where they are cut into logs of various short lengths. As will easily be realized, because of the substantial length of the stems, they are most often laid on the conveyor in crisscross formation with the result that only a very limited number of them and/or only a portion of each one come in firm contact with the gripping rollers responsible for moving them. The conveying is thus inefficient and an attempt has been made to correct this drawback by providing several vibrators along the conveyor and between the gripping rollers. These vibrators are in the form of short plates upwardly pivotable to lift the stems and thus force them into parallel alignment so that they may more uniformly contact the driving rollers of the conveyor.

Such vibrators offer a reasonably good solution in the case of straight tree stems. However, in a usual load of stems laid on the conveyor, there is always at least one that is crooked and curved with the result that this or these stems will only come in contact with certain ones of the driving rollers. Considering that the friction developed by the stems on the sidewalls of the conveyor is high, the fact that one or several of the stems contact only a limited number of driving rollers will often be sufficient to stop the load from moving altogether, or move very slowly. This will in turn require that the stems be realigned by hand.

It is therefore an object of the invention to improve the alignment of the stems in the conveyor regardless of the straightness of the stems.

It is a further object of the invention to ensure a more uniform gripping of the stems in the conveyor by the driving rollers regardless of the condition of straightness of the stems.

These objects may be obtained with a conveyor made according to the teaching of the instant invention wherein it is formed of at least two fixed horizontal sections and one horizontal section between said fixed sections and pivotable upwardly about an axis transverse to the direction of travel of the tree stems. The fixed as well as the pivotable sections are provided with driving members adapted to drive the stems into conveying motion.

It is believed that a better understanding of the invention will be afforded by the description that follows of a preferred embodiment, having reference to the appended drawings wherein:

FIG. 1 is a perspective view of a portion of a conveyor made according to the instant invention, showing a pivotable section between two fixed or stationary sections;

FIG. 2 is a side elevation view of the conveyor portion of FIG. 1;

FIG. 3 is a transverse cross-sectional view taken along line 3—3 of FIG. 2.

Referring to the drawings, the conveyor of the invention comprises a pair of fixed or stationary sections 1, 3 and an intermediate pivotable section 5. Although only three sections are shown, it will be understood that such tree conveyor will usually comprise two or several pivotable sections, such as 5, arranged between fixed or stationary sections such as 1, 3.

The body of each section is formed of upright sidewalls 7 of which the upper ends 9 are bent outwardly and of a series of transverse driving members 11 rotatable about a horizontal axis extending transversally between the side walls 7. Driving members 11 are rollers of the gripping type having a series of spaced longitudinal radial plates 13 formed with toothed projections along the upper edges, which edges are inclined toward the longitudinal center of the rollers. Rollers 11 are driven by means of a chain and sprocket arrangement 15, shown in FIG. 1 in phantom lines, and connected to a reversible motor (not shown).

Rollers 11 are mounted for rotation on the sidewalls 7 in any conventional manner and the pivotable section 5 will preferably comprise two such rollers.

Sidewalls 7 of the fixed body sections 1 and 3 are secured to side channels 17 of the base or chassis of the installation while the pivotable section 5 is mounted at one end on bearing brackets 19 through a transverse axle 21. The other end of section 5 is lifted by means of a pair of fluid motors, preferably hydraulic jacks 23, of which the cylinders are pivotably mounted on members 25 of the base while the piston rods are connected to the bottom of the sidewalls 7 of the section 5. Hydraulic fluid is admitted into jacks 23 through piping 27 and a suitable control mechanism (not shown) will allow control of the actuation of jacks 23 and pivoting of section 5.

Assuming now that one or more curved stems lie in the conveyor so that the curved portion is not engaged by the rollers 11 in the pivotable section 5, the latter will be useless in conveying the stems and the load thereof may be such as to create a friction with the side walls 7 preventing or substantially hindering the conveying motion. By upwardly pivoting section 5, not only will it be possible to increase the driving power of the total conveyor, but this movement may also serve to align the stems in the conveyor.

The normal conveying direction is leftward in FIG. 2 and in order to prevent the end of a stem to hit and damage a roller 11, it is proposed to provide a ramp 29 at every second roller 11, for instance. Ramp 29 should be upwardly inclined in the normal direction of travel of the stems. In a pivotable section such as 5, the ramp 29 will be provided forwardly of the first roller 11 if more than one are provided, that is, between the pivot axis and the first roller following it.

It will be noted that the top end of ramp 29 terminates short of the top of the roller toothed projections when the latter are in the uppermost position. For that reason, and because of the particular configuration of the gripping rollers 11, the said ramps are V-shaped in cross section.

We claim:

1. A generally horizontal conveyor for the conveying of tree stems or the like elongated elements, said conveyor having at least two fixed spaced conveying sections each provided with upright sidewalls and transverse powered driving members spaced from one another and mounted between said sidewalls, said driving rollers being adapted to contact said elongated articles to drive them into conveying motion, the improvement in the combination therewith comprising:
   a. one further conveying section disposed between said two fixed sections and formed of upright sidewalls and at least one powered driving roller for driving said elongated elements when said powered driving roller comes into contact with said elements;
   b. means mounting said further section for pivotal movement about a transverse axis located at one end thereof, said further section being pivotable to and from a first position wherein it is in alignment with said fixed section to a second position wherein its end away from its pivoted end stands above said fixed sections whereby said powered driving roller of the adjacent pivotable section may come in contact with elongated articles that are partially curved in the longitudinal direction and would otherwise remain out of contact with said driving roller of said pivotable section, and
   c. power means to drive said pivotable section into pivoting motion between said positions.

2. A conveyor as claimed in claim 1 including a base over which said sections are mounted; brackets projecting upwardly from said base at one end of said pivotable section and pivot means interconnecting said brackets and said one end of said pivotable section.

3. A conveyor as claimed in claim 2 wherein said driving means for pivoting said pivotable section are at the end of said pivotable section away from said brackets.

4. A conveyor as claimed in claim 3 wherein said driving means for said pivotable section are fluid motors, preferably hydraulic jacks.

5. A conveyor as claimed in claim 3 wherein there are at least two driving rollers in said pivotable section and there is provided a tree stem end-guiding ramp immediately forwardly of the first one of said driving members with respect to said pivot axis; said ramp being upwardly inclined in the direction of said first one of said rollers and terminating short of the top of said first roller.

* * * * *